No. 681,378. Patented Aug. 27, 1901.
R. L. SHOEMAKER & F. R. WILLSON, Jr.
PORTABLE ELEVATING MACHINE.
(Application filed Jan. 12, 1901.)

(No Model.) 7 Sheets—Sheet 1.

No. 681,378. Patented Aug. 27, 1901.
R. L. SHOEMAKER & F. R. WILLSON, Jr.
PORTABLE ELEVATING MACHINE.
(Application filed Jan. 12, 1901.)
(No Model.) 7 Sheets—Sheet 2.

No. 681,378. Patented Aug. 27, 1901.
R. L. SHOEMAKER & F. R. WILLSON, Jr.
PORTABLE ELEVATING MACHINE.
(Application filed Jan. 12, 1901.)
(No Model.) 7 Sheets—Sheet 3.

No. 681,378. Patented Aug. 27, 1901.
R. L. SHOEMAKER & F. R. WILLSON, Jr.
PORTABLE ELEVATING MACHINE.
(Application filed Jan. 12. 1901.)
(No Model.) 7 Sheets—Sheet 4.
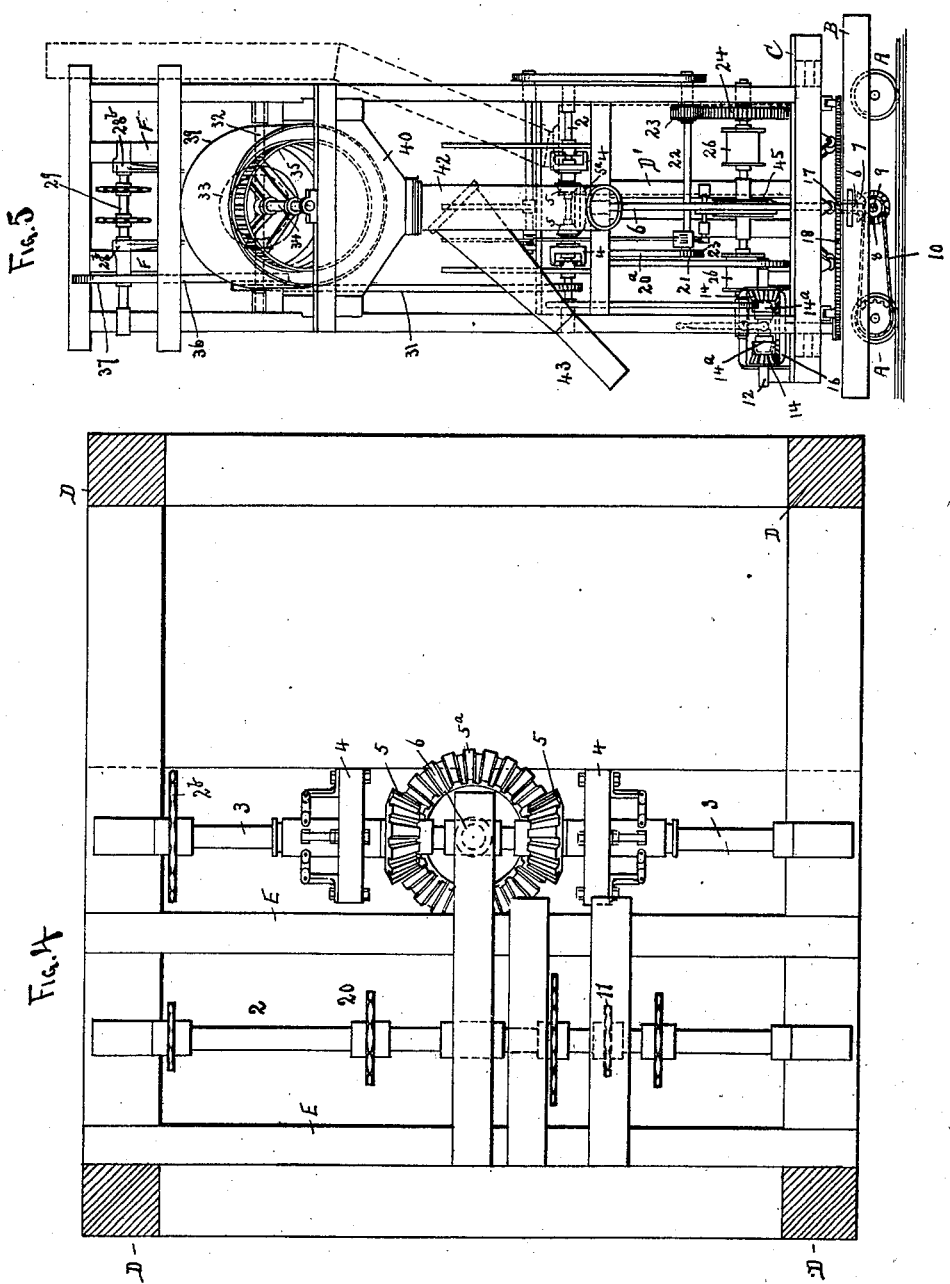

No. 681,378. Patented Aug. 27, 1901.
R. L. SHOEMAKER & F. R. WILLSON, Jr.
PORTABLE ELEVATING MACHINE.
(Application filed Jan. 12, 1901.)
(No Model.) 7 Sheets—Sheet 5.

Witnesses:
A. E. Williams Jr.
C. N. Woodward.

Inventors.
Rankin L. Shoemaker.
Freeman R. Willson Jr.
By H. H. Bliss,
Attorney.

THE NORRIS PETERS CO., PHOTO-LITHO., WASHINGTON, D. C.

No. 681,378. Patented Aug. 27, 1901.
R. L. SHOEMAKER & F. R. WILLSON, Jr.
PORTABLE ELEVATING MACHINE.
(Application filed Jan. 12, 1901.)
(No Model.) 7 Sheets—Sheet 6.
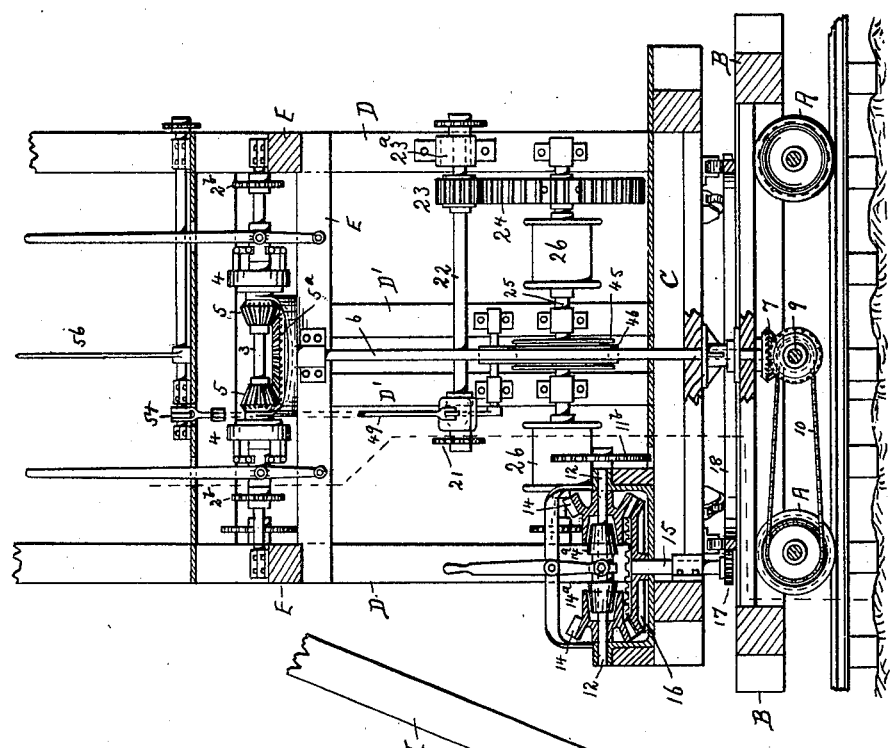

No. 681,378. Patented Aug. 27, 1901.
R. L. SHOEMAKER & F. R. WILLSON, Jr.
PORTABLE ELEVATING MACHINE.
(Application filed Jan. 12, 1901.)
(No Model.) 7 Sheets—Sheet 7.
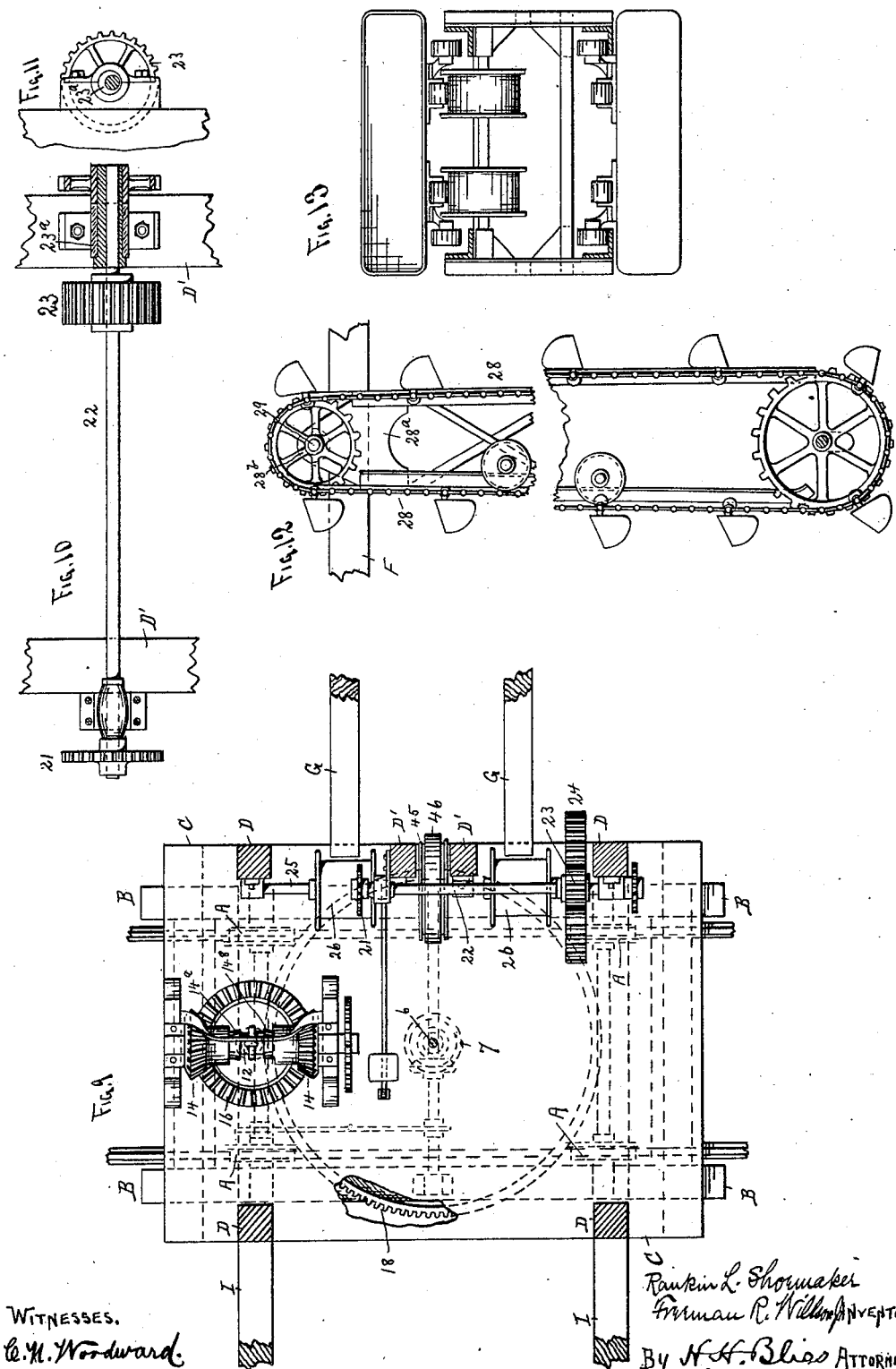

UNITED STATES PATENT OFFICE.

RANKIN L. SHOEMAKER, OF NEW COMERSTOWN, AND FREEMAN R. WILLSON, JR., OF COLUMBUS, OHIO, ASSIGNORS TO THE JEFFREY MANUFACTURING COMPANY, OF COLUMBUS, OHIO.

PORTABLE ELEVATING-MACHINE.

SPECIFICATION forming part of Letters Patent No. 681,378, dated August 27, 1901.

Application filed January 12, 1901. Serial No. 43,045. (No model.)

*To all whom it may concern:*

Be it known that we, RANKIN L. SHOEMAKER, of New Comerstown, in the county of Tuscarawas, and FREEMAN R. WILLSON, Jr., residing at Columbus, in the county of Franklin, State of Ohio, citizens of the United States, have invented certain new and useful Improvements in Portable Elevating-Machines, of which the following is a specification, reference being had therein to the accompanying drawings.

Figure 1:
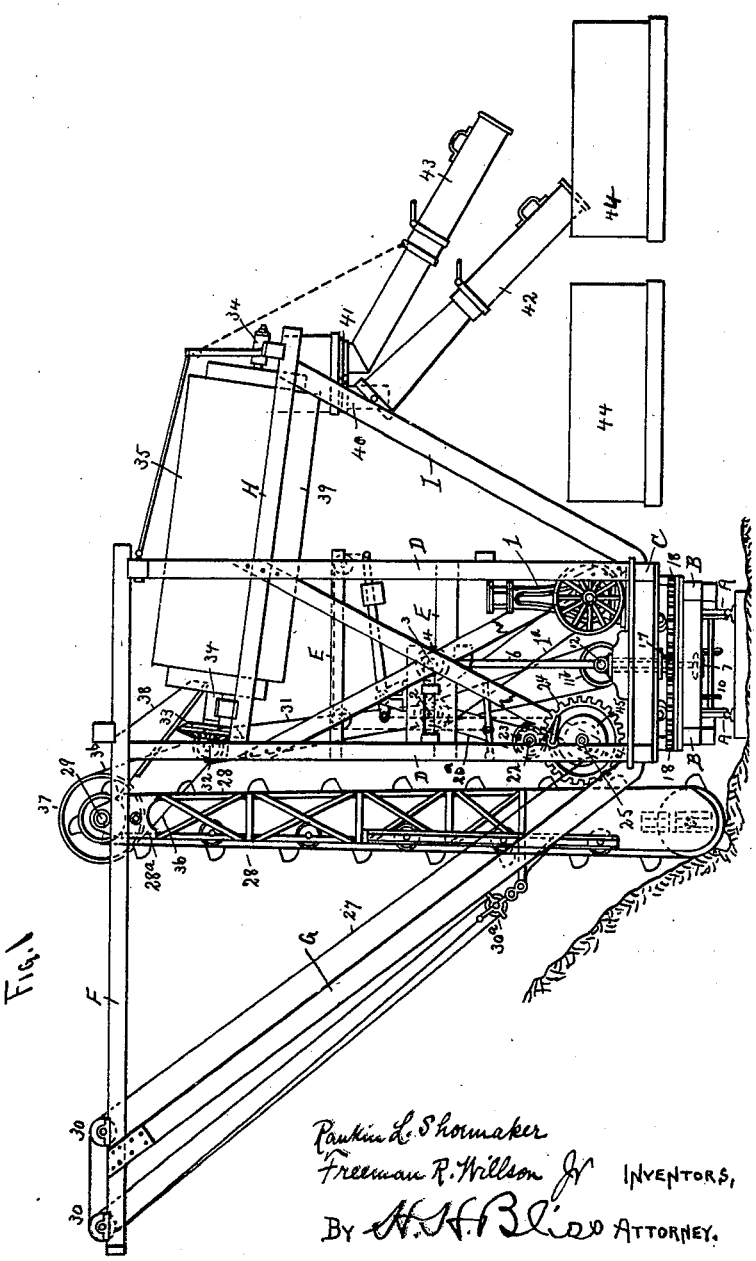
Figure 2:
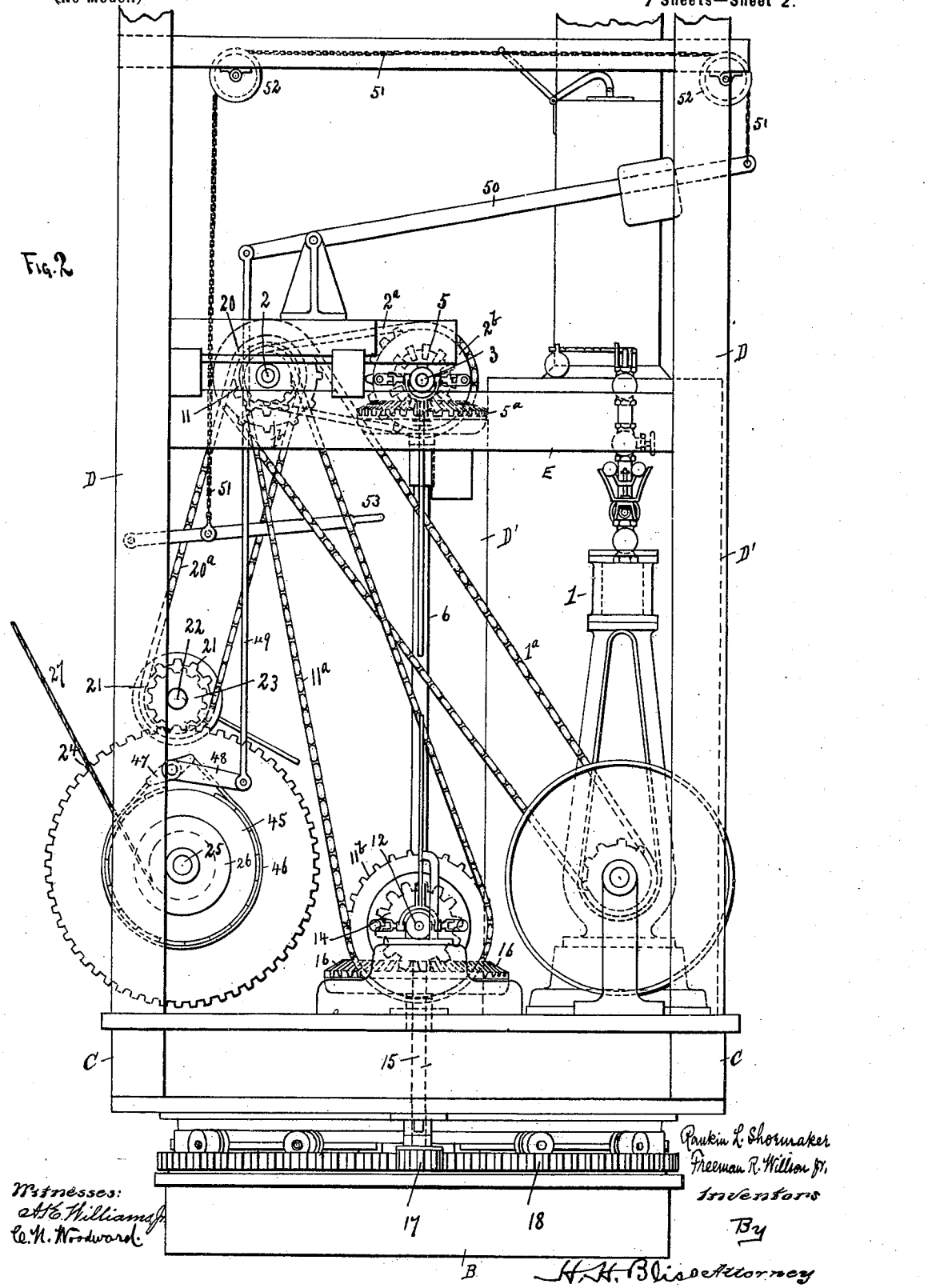
Figure 3:
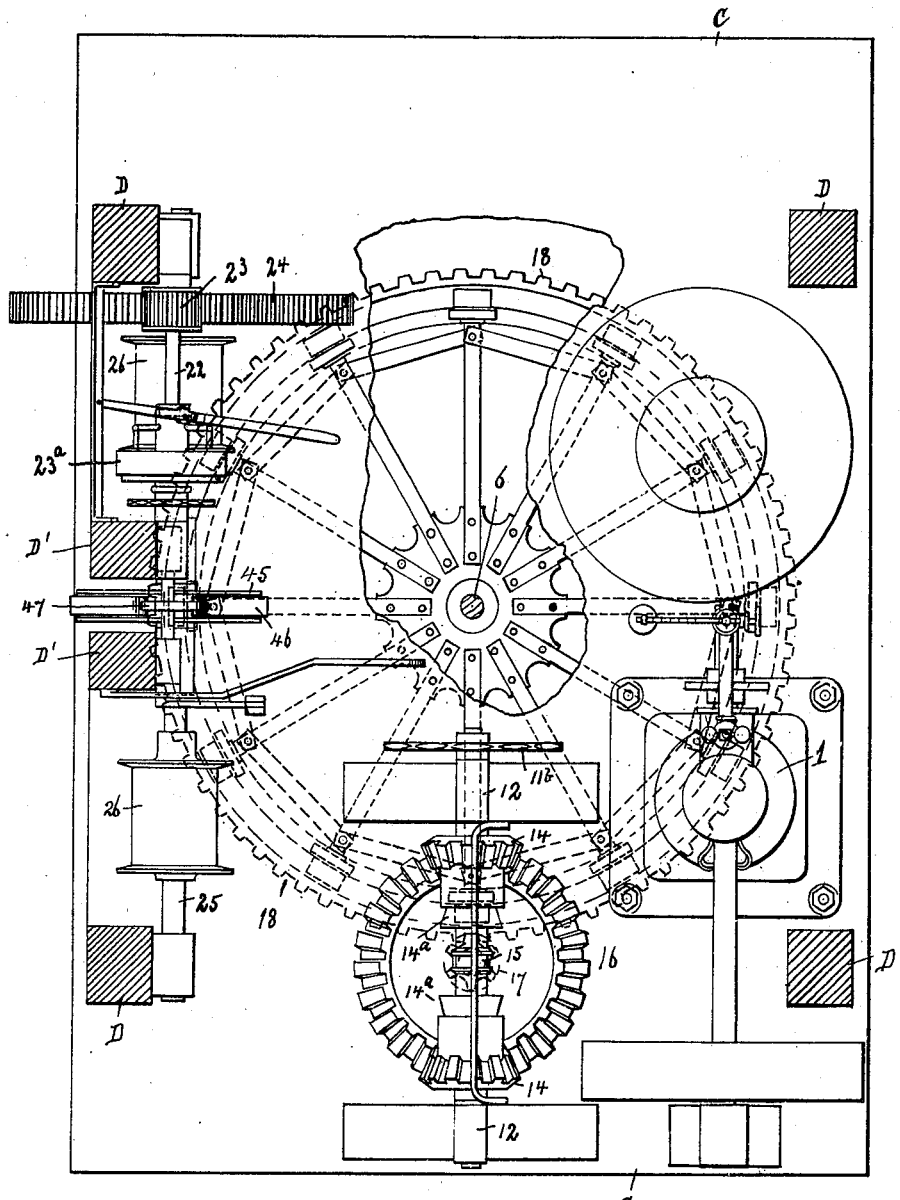
Figure 6:
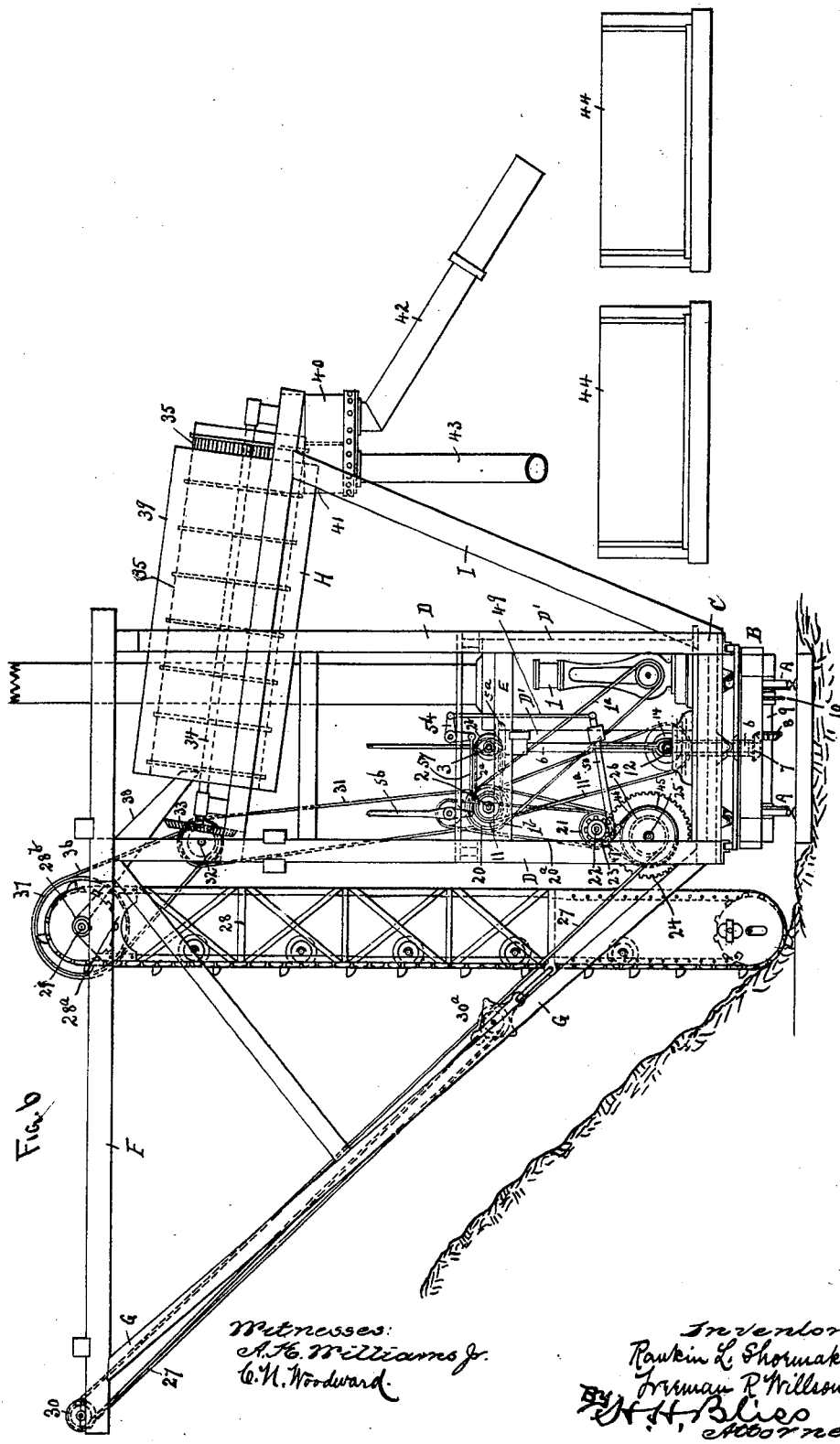

Figure 1 is a side view of a mechanism embodying our improvements. Fig. 2 is an elevation, on a larger scale, of the operative parts of the mechanism. Fig. 3 is a horizontal section on the line $x\ x$ of Fig. 2 with the floor partially broken away to illustrate the construction of the frame-revolving mechanism. Fig. 4 is a section on the line $y\ y$ of Fig. 2, showing the framework and some of the parts attached thereto, looking downward. Fig. 5 is a side elevation looking from the left in Fig. 6. Fig. 6 is a side view of a modified mechanism embodying our improvements. Fig. 7 is an enlarged sectional side elevation. Fig. 8 is an enlarged sectional rear elevation; and Fig. 9 is a transverse section of the lower portion of the supporting-framework and the machinery carried thereby as illustrated in Fig. 6. Figs. 10 and 11 are enlarged details of the mechanism for throwing the hoisting-drums out of gear. Figs. 12 and 13 are enlarged details of the elevator construction.

The operative parts of the mechanism are supported upon a car having wheels A A, adapted to fit ordinary railway-tracks, a bottom truck-body B, resting upon the wheel-axles, and an upper horizontally-adjustable table or bed C. The bed C carries corner-uprights D D and intermediate uprights D'. The uprights are connected together by suitable sills or cross-girths E at suitable distances from the bed, and at the upper end of the main frame there are elongated laterally-projecting overhanging frame-bars F F, the outer ends of which are braced by inclined beams or bars G. In the opposite direction there extends laterally from the main frame a supplemental frame having the top bars H and inclined brace-bars I for the supporting of parts to be described. Upon the framework thus described are supported the mechanism for engaging with and elevating the material, the mechanism for screening and separating, the means for guiding the separated materials to their places of delivery, the parts by which adjustments can be effected of those mechanisms which can be moved upon the frame, the engine or motor, and the means for transmitting power from the latter to the various parts of the machine.

1 is an engine mounted on the bed C and having its shaft connected by a chain $1^a$ to the chain-wheel $1^b$ on the shaft 2. This shaft transmits power to the shaft 3 through the chain $2^a$ and the sprocket-wheel $2^b$. The shaft 3 has two loose bevels 5 5, which can be engaged with the shaft by clutches 4 4, respectively.

$5^a$ is a bevel-wheel adapted to be engaged alternately with the bevels 5 5 or be disengaged from both.

6 is a shaft to which the bevel-wheel 5 is secured, this shaft extending downward at the central vertical line of the bed and the car-truck. At its lower end it is provided with a bevel-wheel 7, which engages with a bevel-wheel 8 on a shaft 9, supported on the under side of the truck-frame. The shaft 9 is connected by a chain 10 to one of the car-axles. When one of the clutches 4 connects its wheel 5 to shaft 3, the latter, being in constant rotation, rotates the bevel-wheel $5^a$, the vertical shaft 6, the bevel-gearing 7 8, and the car-axle, causing the car, with all of the parts supported thereon, to move bodily along the track. It can be moved in the opposite direction by reversing the clutches at 4 4. After the car has been brought to the desired place for working the clutches are put in their neutral position and the car is held stationary.

In order to adjust the upper bed and the operative parts supported thereon in horizontal planes relative to the truck, the following devices are used:

On shaft 2 there is a sprocket-wheel 11, which drives chain $11^a$, the latter engaging with the sprocket-wheel 11$^b$ on a shaft 12, mounted just above the bed C. This shaft has two loose bevel-pinions 14, adapted to be connected to the shaft by clutches 14$^a$, both wheels meshing with the horizontal bevel-wheel 16 on a vertical shaft 15. The lower end of this shaft carries a spur-pinion 17, which meshes with a circular rack 18, the latter being secured rigidly to the car-truck. If the clutches at 14$^a$ 14$^a$ are moved in one direction, the corresponding bevel-wheel 14 causes the parts at 16, 15, 17, and 18 to impart rotation to the bed C and the parts above it, and by throwing the clutches in the opposite direction the other bevel-wheel causes the rotation of the bed in the other way.

After the car-truck and bed have been put in proper places, as above described, the operating mechanisms are actuated as follows:

20 is a sprocket-wheel on shaft 2, connected with a sprocket-wheel 21 on shaft 22 by the chain 20$^a$.

23 is a spur-pinion on shaft 22, which engages with the wheel 24, there being at 23$^a$ a clutch for connecting and disconnecting the shaft 22 and the spur-pinion 23. The wheel 24 is on the shaft 25, to which are secured two rope-drums 26.

27 is a rope running from each drum up along the inclined bars G, passing over a fixed sheave 30, thence downward to a movable sheave 30$^a$, thence back to the fixed sheave, and from there again to the movable one. The sheave 30$^a$ is connected by a link to the elevator-frame, and as this frame is suspended from the shaft 29 at the top the ropes, drums, and drum-rotating devices can be used to throw the lower end of the elevator outward and hold it in any desired inclination. The elevator has a frame 28, formed of vertical bars, straight brace-bars, inclined brace-bars, bottom plates, and top plates, all substantially as shown.

The top plates 28$^a$ are provided with tubular bearings, which are fitted upon the journals 28$^b$, secured to the top frame-bars F. The shaft 29 at the upper end of the conveyer is mounted in the bearings 28$^b$, this shaft and bearings or journal parts 28$^a$ being supported independently of each other, so that the shaft is free from the strain and pressure caused by the weight of the conveyer-frame.

Power is taken from the shaft 2 by chain 31 to an intermediate shaft 32. This shaft is connected by a bevel-gear at 33 to the shaft 34 of a revolving screen 35. The shaft 32 also has a sprocket-wheel, which is connected by the chain 36 to a wheel 37 on the shaft 29 at the upper end of the elevator. When the shafting and chains are in operation, the elevator chains and buckets will be moved, the buckets loading themselves at the bottom of the elevator with the sand, gravel, or other material that is to be carried. This material is delivered to the chute 38, which discharges it into the interior of the rotary screen 35. Around this screen there is a drum 39, the drum and screen being set at a relatively sharp inclination, so that the materials in them respectively will be advanced toward the lower end and discharged.

The mechanism shown is principally used for elevating sand and gravel and then separating them, and in such case the gravel will be retained in the inner screen and finally delivered at its lower end, while the sand that is separated therefrom and is caught in the outer drum will be separately delivered. The gravel-receptacle is shown at 40 and the sand-receptacle at 41. With the receptacle 40 communicates the extensible and horizontally-adjustable delivery-chute 42, and with the receptacle 41 communicates and to it is adjustably secured the chute 43, these chutes being adapted to deliver the materials which they carry downward to cars, as at 44.

Description has been given above of the manner of swinging outward the lower end of the elevator-frame around the shaft 29 as an axis. When the elevator-frame is being allowed to return toward the main frame, we control its downward movement as follows:

45 is a friction-drum on the shaft 25. 46 is a flexible brake-band surrounding this brake-drum and having its ends connected to a lever 47, the crank-arm 48 of which is connected to a link 49. These parts can be operated in any suitable way. In one mechanism shown in the drawings the link 49 is pivoted to a lever 50, with which a chain 51 is connected, which runs over guide-pulleys 52 and down to a handle-lever 53, accessible to the operator. In the other mechanism illustrated the link is connected to a bell-lever 54, which in turn is connected to lever 56 by a link 57.

What we claim is—

1. In an elevating and screening mechanism of the character described, the combination of the wheeled truck-frame, the main frame horizontally adjustable on the truck-frame, the outward-swinging elevator suspended at its upper end from the main frame, the screening mechanism, the power devices on the main frame, power-transmitting devices connecting the power devices with the elevator-chains and with the screening devices, means for detachably connecting the power devices to the elevator-adjusting devices, reversible power-transmitting devices for detachably connecting the power devices to the truck-wheels, and reversible power-transmitting devices for detachably connecting the power devices to the means by which the main frame is adjusted axially, substantially as set forth.

2. In a portable elevating and screening mechanism, the combination of the wheeled truck-frame, the main frame thereon, the outward-swinging elevator suspended at its upper end from the main frame, the screening mechanism, the power devices on the main frame, the power-transmitting devices connecting the power devices with the elevator-chains and with the screening devices, means for detachably connecting the power devices to the elevator-adjusting devices, and means for controlling at will the inward swinging of the elevator-frame, substantially as set forth.

3. In an elevating and screening mechanism, of the character described, the combination of the wheeled truck-frame, the main frame thereon, the outward-swinging elevator extended at its upper end from the main frame, the screening mechanism, the power devices on the main frame, power-transmitting devices connecting the power devices with the elevator-chains and with the screening devices, the horizontally and vertically adjustable chutes, one for the tailings of the screen and one for the material which passes radially from the screen, and means for adjusting the screening mechanism bodily horizontally relatively to the truck-frame, substantially as set forth.

RANKIN L. SHOEMAKER.
FREEMAN R. WILLSON, JR.

Witnesses:
C. A. DODDS,
ROBT. H. JEFFREY.